United States Patent [19]

Shigeno et al.

[11] Patent Number: 5,395,582
[45] Date of Patent: Mar. 7, 1995

[54] HOLLOW INJECTION MOLDING METHOD

[75] Inventors: Kazumichi Shigeno; Shigeru Yabuya, both of Inazawa, Japan

[73] Assignee: Toyoda Gosei Co., Ltd., Nishikasugai, Japan

[21] Appl. No.: 928,422

[22] Filed: Aug. 13, 1992

[30] Foreign Application Priority Data

Aug. 13, 1991 [JP] Japan .................................. 3-228277

[51] Int. Cl.6 ............................................ B29C 45/17
[52] U.S. Cl. ...................................... 264/572; 425/130
[58] Field of Search .......................... 264/572; 425/130

[56] References Cited

U.S. PATENT DOCUMENTS

| 4,101,617 | 7/1978 | Friedrich . | |
| 4,136,220 | 1/1979 | Olabisi | 264/572 |
| 4,923,666 | 5/1990 | Yamazaki et al. | 264/572 |
| 5,162,230 | 11/1992 | Ziegler et al. | 264/572 |
| 5,254,306 | 1/1993 | Inada et al. | 264/572 |
| 5,262,103 | 11/1993 | Komiyama et al. | 264/572 |

FOREIGN PATENT DOCUMENTS

| 4102319 | 8/1991 | Germany | 264/572 |
| 56-56832 | 5/1981 | Japan | 264/572 |
| 57-167217 | 10/1982 | Japan | 264/572 |
| 61-53208 | 11/1986 | Japan | 264/572 |
| 3-121820 | 5/1990 | Japan | 264/572 |
| 90/12679 | 11/1990 | WIPO | 264/572 |

OTHER PUBLICATIONS

Shah et al., Gas Injection Molding of Thermoplastic Composite Window Guidance Channel, Internation Congress and Exposition SAE International, Mar. 1, 1991.
Webster's Ninth New Collegiate Dictionary, 1986, p. 323.

Primary Examiner—Catherine Timm
Attorney, Agent, or Firm—Cushman, Darby & Cushman

[57] ABSTRACT

An apparatus and method are provided for producing a hollow molded product having a thick part free from a thin part or defect. According to the method, a mold is designed to have a cavity for a hollow molded product having a bent portion such as an assist grip. This mold is provided with dams mounted in a gas passage around an in-course in the bent forming portion. When injecting fluid into the already injected resin in the cavity, the dams are so designed to function in guiding the resin to flow between the dam and an out-course of the cavity. By this method, sufficient amount of the resin remains around the in-course so as to form a thick part of the hollow molded product.

9 Claims, 5 Drawing Sheets

HOLLOW INJECTION MOLDING METHOD

BACKGROUND OF THE INVENTION

1. Field of the Invention

The present invention relates to an apparatus and method for injection molding hollow shaped bodies by means of a short-shot method.

2. Description of Related Art

Various kinds of hollow molded products have been increasingly manufactured for the purpose of saving resources and reducing weight. In manufacturing these hollow molded products, a short-shot method has been conventionally employed, as disclosed in Japanese Patent Application Laid Open No. 56832/1981 and U.S. Pat. No. 4,101,617. According to this method, resin is preliminary injected into a cavity so as to be 50 to 90% of its capacity. Fluid, such as gas, is then injected into the resin for producing a hollow molded product. Prior to injection, the resin is heated to be in a hot molten state. The resin remains soft even while the fluid is injected. After the fluid is injected, a mold for hollow injection molding is cooled, by which, the resin therein hardens.

Hollow molded products produced in the above way may be used for example as an assist grip mountable in a vehicle interior. See grip 9 shown in FIG. 10. The assist grip 9 is provided with bent portions 91 on its right and left sides, each end portion having a space 92 at its end for accommodating fixtures. The assist grip 9 is composed of a resin part 39 as an outer shell, and a hollow section 49.

In the short-shot method, the resin is injected halfway into the cavity and forced forward by the fluid injected thereafter. In the above method, a hollow section is formed within the body. However, when producing the hollow molded product such as the assist grip 9 having bent portions 91 according to this method, an in-course 90 is likely to form a thin wall 99, as shown in FIG. 11. This is because the fluid injected into the resin tends to flow along the in-course 90 where the flow resistance is relatively low, resulting in a thin outer shell.

The thus-formed thin wall 99 decreases in strength and is easily cracked, thus causing defects. The resin around the thin wall 99 that has been somewhat cooled will flow abruptly due to injected fluid, resulting in albinism formed in the thin wall. This phenomenon deteriorates the appearance of the bent portion 91 of the assist grip 9. In order to fit a screw into a fixture space of the hollow section, it is preferable to have a thick wall around the bent portion. As described above, the hollow molded product is required to have an outer shell as a solid section made partially thick.

SUMMARY OF THE INVENTION

It is an object of the present invention to provide an apparatus and method for producing a hollow molded product which a permits its outer shell to be made partially thick.

The present invention provides an apparatus and method for producing a hollow molded product, in which resin is injected into the cavity of the mold which has a dam on its surface. Fluid is then injected into the resin, forming a hollow part between the dam and a part of the mold surface, and forming a thick part between the dam and the other part of the mold surface.

Other features and advantages of the present invention will be apparent from the following description and the accompanying drawings.

DETAILED DESCRIPTION OF THE PRESENTLY PREFERRED EMBODIMENTS

The most salient feature of the present invention is the use of a mold for hollow injection molding in which a dam is provided at a location requiring to be formed into a thick wall. This mold is so constructed to allow the fluid to flow between the dam and a mold surface. The dam is so provided to project inwardly into the cavity. A plurality of dams may be provided in the respective locations.

Figure 2:
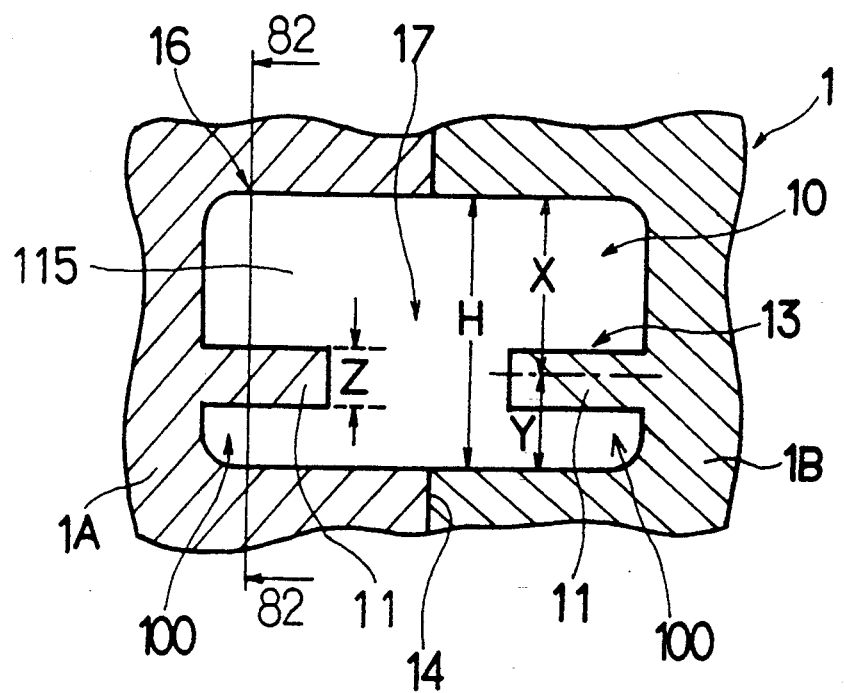
FIG. 2 is a sectional view taken along line 2—2 of FIG. 1 of a hollow injection mold embodying the principles of the present invention.

When the present invention is applied for producing a hollow molded product having bent portions, dams are provided at locations upstream of the resin and the fluid, near an in-course where the bent forming portions are defined within the cavity. Preferably, the dams are formed at locations near the in-course about 1/5 or $\frac{1}{3}$ of the height of the bent portion, as shown in FIG. 2. The dam preferably is elongated to have its width ranging from 1 to 10 mm, a length from 2 to 20 mm and a height (thickness) from 2 to 5 mm, so that the fluid is forced to flow between the dam and the cut-course.

The in-course 100 herein refers to the inner corner part of the bent portion of the cavity. The out-course 16 herein refers to the outer corner part of the bent portion of the cavity, which is located opposite to the in-course.

The method for hollow injection molding according to the present invention may use various types of thermoplastic resins, for example, polypropylene (PP), acrylonitrile butadiene styrene (ABS), polyphenylene oxide (PPO), and flexible polyvinyl chloride (PVC). The fluid used for the method may be selected from inert gas, such as AR and He and non-oxidation gas, such as $N_2$, or liquid such as water and oil.

In the present invention, the fluid may be injected after the resin is injected or injected together with the resin after being mixed therewith by a small amount of the resin.

The mold for hollow injection molding of the present invention is provided with a dam at a location to be formed into a thick wall. As a first step of the molding method, the resin with its volume about 50-90% of the cavity capacity is injected therein by means of the short-shot method.

The fluid is then injected into the resin. At this moment, the fluid normally flows through the inside of the resin evenly. However, the resin flowing around the dam provided in the mold gradually cools. Accordingly, the injected fluid is forced to flow into a soft molten resin that has not yet been cooled between the dam and a mold surface. The resin then completely cools and hardens. By this, sufficient amount of resin resides in the part to be formed into the thick wall, thus preventing a thin wall to be formed.

The present invention provides a method for hollow injection molding that permits a hollow molded product having a thick wall to be produced.

EMBODIMENT 1

Figure 3:
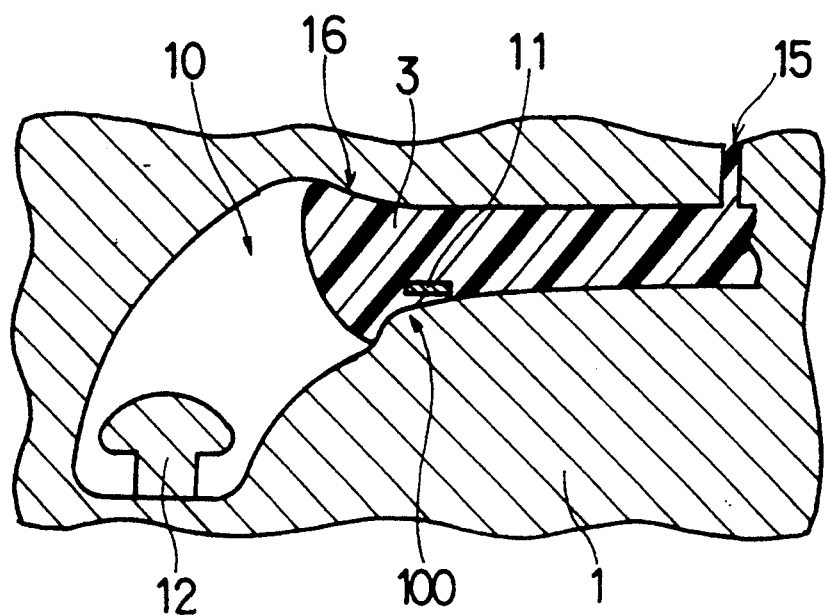
FIG. 3 is a sectional view of a cavity of the first embodiment where resin is injected.
Figure 4:
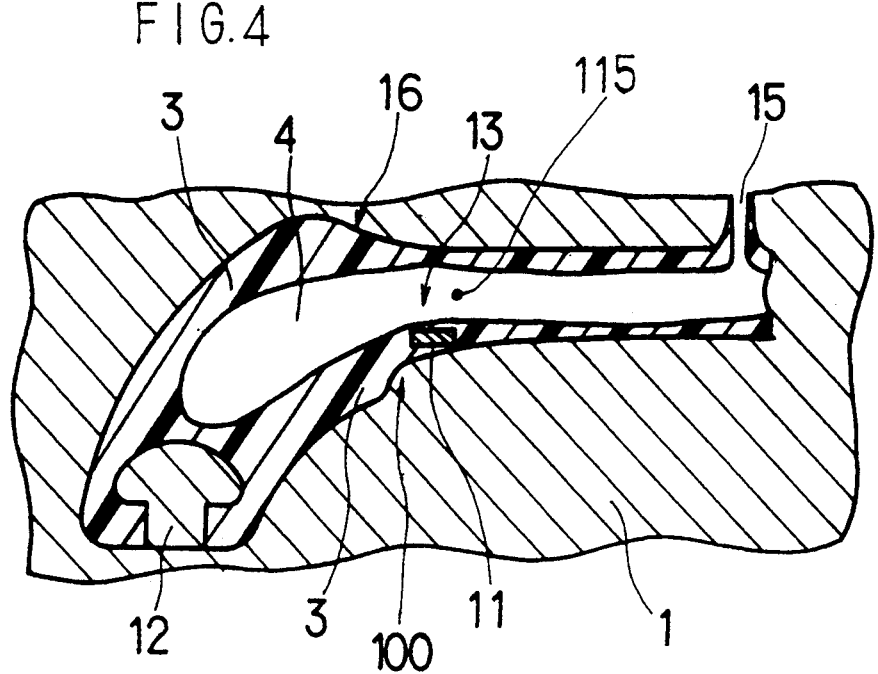
FIG. 4 is a sectional view of the cavity of the first embodiment where fluid is injected into the resin.
Figure 5:
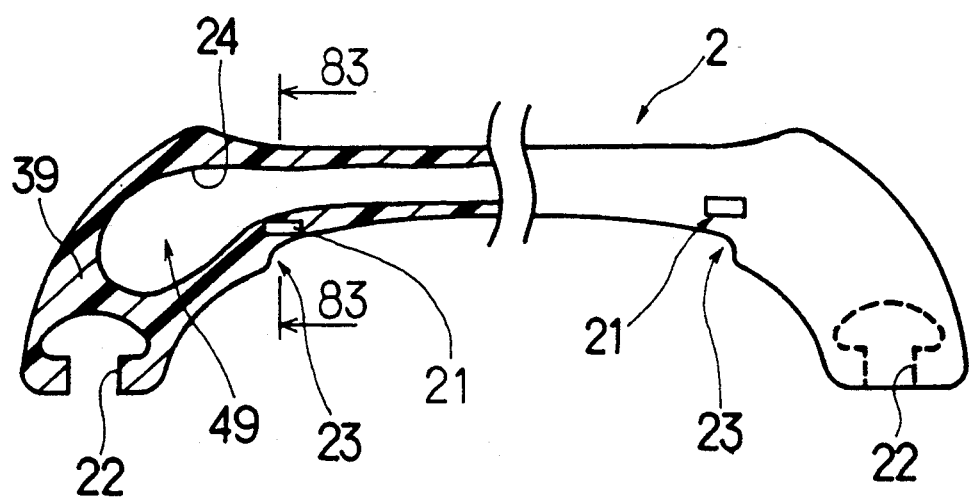
FIG. 5 is a partially cutaway view in section of an assist grip being the hollow molded product of the first embodiment.

The method for hollow injection molding of the present invention is described with reference to FIGS. 1 to 6. As shown in FIG. 5, this embodiment depicts the method for hollow injection molding to produce an exemplary assist grip 2 having bent portions 23.

Figure 1:
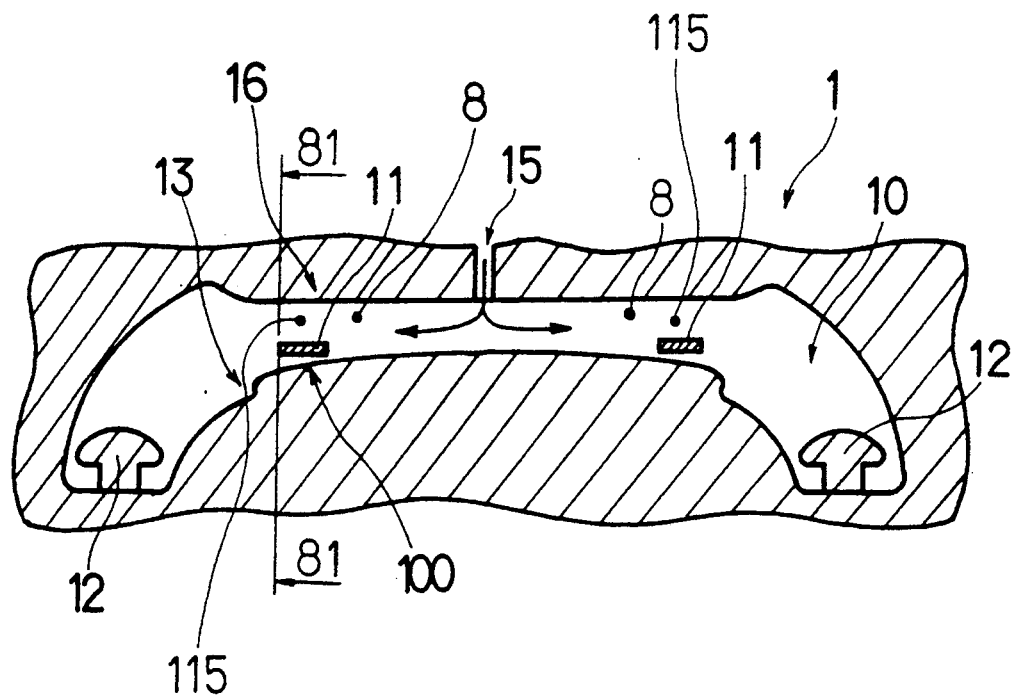
FIG. 1 is a sectional view taken along line 1—1 of a hollow injection mold of an embodiment shown in FIG. 2.

The FIG. 1 mold 1 used in the present invention, has a cavity 10 for manufacturing the assist grip 2 as a hollow molded product having bent portions 23. Cavity 10 is provided with two dams 11 at a location of a passage 8 where gas flows in the vicinity of an in-course 100. In FIGS. 1, 3 and 4, the mold 1 is designed to force fluid 4 injected after the resin 3 is injected, into the cavity 10 through a space 115 between the dams 11 and an out-course 16.

As FIGS. 1 and 2 show, the dams 11 are provided in the passage 8 in the vicinity of the in-course 100 of the bent forming portion 13 within the cavity 10. The dams 11 are located near a gate 15, upstream of the bent forming portion 13. The mold 1 is divided into left and right mold portions, each portion having a parting surface 14, respectively, which will become more apparent below.

The dams 11 are provided in the bent forming portion 13 within the cavity 10 approximately ⅓ up the height of the cavity, as shown in FIG. 2. That is, the center of the dams 11 is located in the position where the ratio of X to Y is 2 to 1.

As FIGS. 1 and 2 show, each dam 11 is a thin and long projection having a width ranging from 6 to 9 mm, a length from 2 to 20 mm, and a thickness Z of about 3 mm. The cavity 10 has a height H of approximately 15 mm. As shown in FIG. 2, each dam 11 is so fixed to project from the respective left and right parting mold surfaces. The space defined between the two dams 11 is a flow path 17 through which the resin 3 and the fluid 4 flow. Furthermore, the flow path 17 functions in changing the flow direction of the fluid 4 from the in-course 100 to the out-course 16.

The cavity 10 has a gate 15 on its center top, through which the resin 3 and the fluid 4 are injected. As FIG. 2 shows, mold 1 is composed of a left mold 1A and a right mold 1B, each of which has a parting surface 14. The resin 3 may be polypropylene (PP) resin. The fluid 4 may be nitrogen ($N_2$) gas, which is to be injected at a pressure of about 200 kg/cm².

In the first embodiment, mold 1 has the dams 11 in the gas passage 8 in the vicinity of the in-course 100, in the bent forming portion 13. When using the mold 1, the resin 3 is injected into the cavity 10 as FIG. 3 shows. At this time, the resin 3 is injected into 70% of the cavity capacity by means of a short-shot method. By this, the capacity for accommodating the fluid 4 can be ensured by 30% of the cavity capacity.

Then as shown in FIG. 4, the fluid 4 is injected into the resin 3. At this time, the injected fluid 4 tends to flow into the in-course 100 of the bent forming portion 13. However, since dams 11 are provided in the gas passage 8 near the in-course 100, the injected fluid 4 is guided to flow through the softened resin between the dams 11 and the upper cavity surface. A sufficient amount of resin 3 for producing the hollow molded product remains in the in-course 100 defined between the dams 11 and the lower cavity surface, preventing this region from being partially thin.

Figure 6:
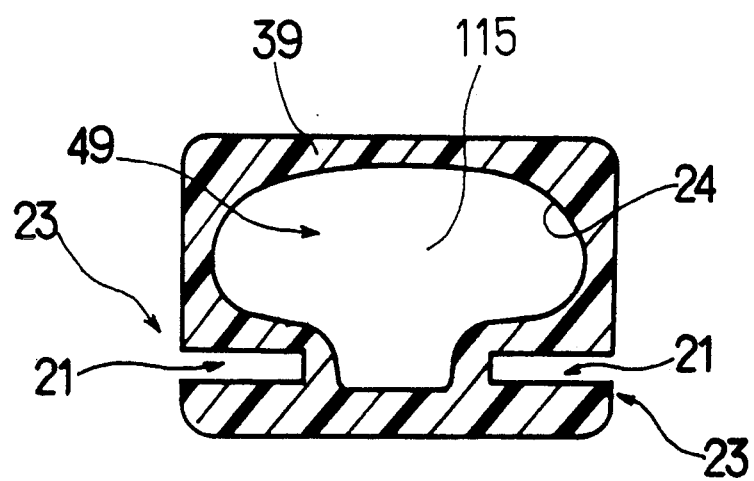
FIG. 6 is a sectional view taken along line 6—6 of FIG. 5.

As shown in FIGS. 5 and 6, the above molded assist grip 2 is composed of a main body 39, a hollow section 49 formed therein, an inner wall 24, and a fixture space 22. The bent portion 23 has a recess 21 formed by the dams 11.

The hollow injection mold of the present invention, therefore permits the production of an excellent hollow molded product having a thick wall, free from any thin part or defect formed in the bent portion 23.

EMBODIMENT 2

Figure 7:
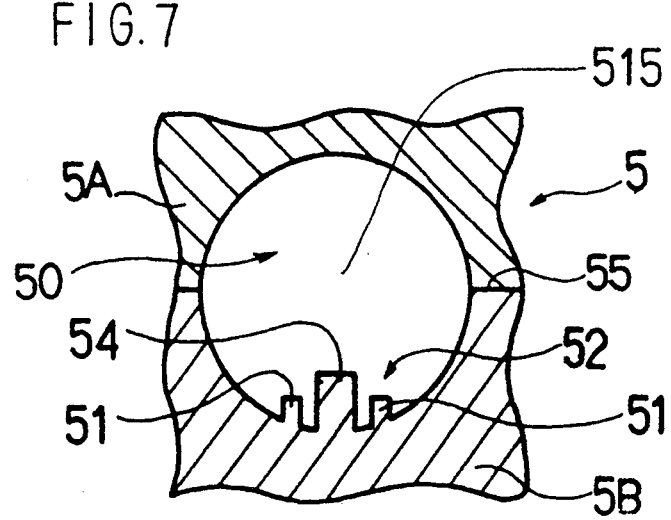
FIG. 7 is a plan view of a hollow injection mold of a second embodiment of the present invention.
Figure 8:
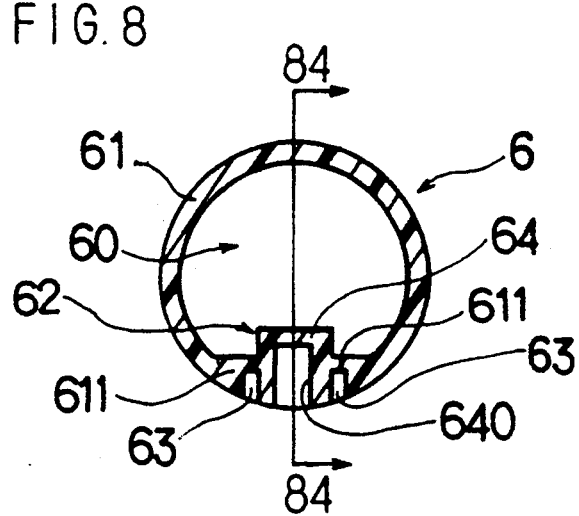
FIG. 8 is a sectional view of the hollow molded product of the second embodiment provided with a space for accommodating a screw.
Figure 9:
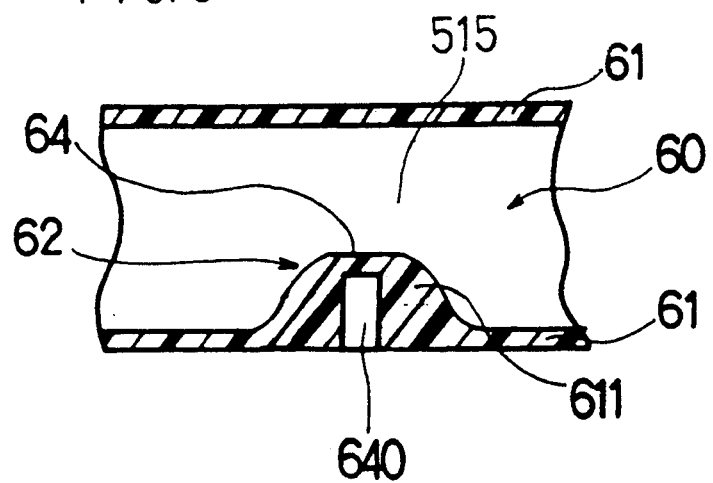
FIG. 9 is a sectional view taken along line 9—9 of FIG. 8.
Figure 10:
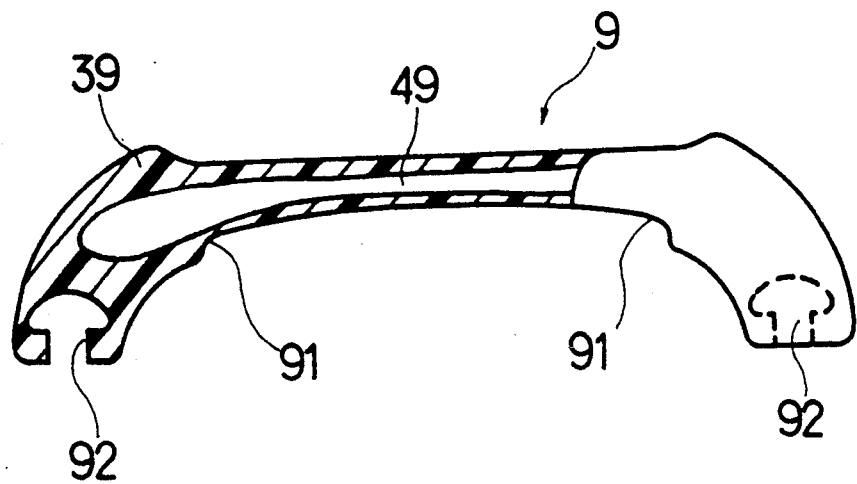
FIG. 10 is a partially cutaway view in section of an assist grip being the hollow molded product of prior art.
Figure 11:
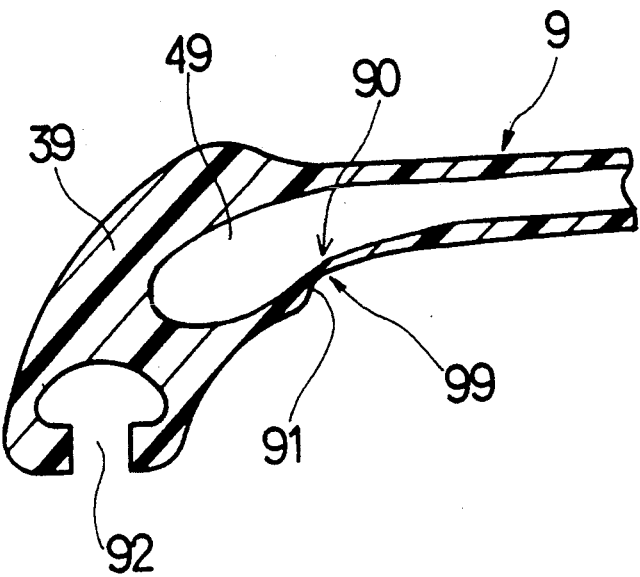
FIG. 11 is a sectional view of the part around a bent portion where a thin wall is formed in the conventional assist grip.

In this embodiment, as FIGS. 7, 8 and 9 show, a tubular hollow molded product 6 is produced in which a fixture space 64 is provided with a straight part 62, where a screw is fastened.

As shown in FIG. 7, a mold 5 of this embodiment has a cavity 50 therein for producing the tubular hollow molded product 6. A lower part 52 of cavity 50 has a center projection 54 for forming the fixture space 64 and a pair of dams 51 symmetrically placed so as to be faced with each other. The mold 5 is composed of an upper mold 5A and a lower mold 5B, each of which has a parting surface 55, respectively. A space 515 defined between the dams 51 and the upper mold 5A is so constructed to allow resin and fluid to flow therethrough. The resin, such as polypropylene (PP), is injected into the cavity 50 for producing the hollow molded product 6. The resin flows along the contour of the fixture space 64 and a tubular part 61, as FIGS. 8 and 9 show. Then fluid such as nitrogen gas ($N_2$) (not shown), is injected into the resin. Alternatively, the resin and the fluid may be injected at the same time by preliminary injecting a small amount of the resin.

The injected fluid tends to flow into the resin evenly. However, the resin around the dams 51 provided in the hollow injection mold 5 is gradually cooled and hardened. As FIGS. 8 and 9 show, the fluid flows through the space 515 between the dams 51 and the mold surface to form a hollow section 60 and a thick part 611 between the dam 51 and the other mold surface.

The thus-produced hollow molded product 6 has a thick part 611 around the fixture space 64 and on both sides thereof. The hollow molded product has a screw hole 640 formed in the fixture space 64. A recess 63 is formed by virtue of the dams 51 on each side of the screw hole 640. The fixture space 64 accommodates a screw such as a tapping screw tightened therewith when mounting the tubular hollow molded product 6 to an automobile. The fixture space 64 is designed to fasten the screw tightly.

The present invention easily provides the hollow molded product having thick parts 611 even at a straight part 62. The same effects as those of the first embodiment can be obtained.

While the invention has been described with reference to the examples, it is to be understood that modifications or variations may be easily made by a person of ordinary skill in the art without departing from the scope of this invention which is defined by the appended claims.

What is claimed is:

1. A method for producing a hollow molded product having a bent portion using a mold cavity defined by a first mold surface and a second mold surface disposed in opposing relation to said first mold surface, said method comprising the steps of:
   placing at least one dam member between said first and second mold surfaces, closer to said first mold surface and near the bent portion,
   injecting molding resin into at least a portion of said mold cavity;
   injecting fluid into the molding resin for flowing the resin about the dam member and thereby forming a hollow portion between the dam member and said second mold surface and a solid portion between the dam member and said first mold surface, said dam member being constructed and arranged so as to cause a portion of the hollowed molded product to have a thick wall at the bent portion thereof; and
   removing the hollow molded product from the mold cavity.

2. The method as claimed in claim 1, including disposing said at least one dam member upstream of said bent portion so that said molding resin flows around said at least one dam member prior to flowing to said bent portion.

3. The method as claimed in claim 1, including disposing said at least one dam member at one of 1/5 and ⅓ of a height of said bent portion.

4. The method as claimed in claim 1, wherein said at least one dam member has a width between 6 and 9 mm, a length between 2 and 20 mm and has a thickness of approximately 3 mm.

5. The method as claimed in claim 1, wherein said molding resin is polypropylene resin.

6. The method as claimed in claim 1, wherein said fluid is nitrogen gas injected at a pressure of approximately 200 kg/cm$^2$.

7. The method of claim 1 wherein the dam member is positioned at an intermediate point along the length of the mold cavity.

8. The method of claim 1 wherein the step of injecting fluid includes the step of flowing the resin about the dam member in the same direction as the fluid flows within the cavity.

9. A method for producing a hollow molded product having a bent portion using a mold cavity having first and second opposing mold surfaces, said method comprising the steps of:
   injecting molding resin into at least a portion of the mold cavity;
   interrupting a flow of resin near the first mold surface prior to the resin reaching the bent portion so that the resin forms a thick portion at the bent portion;
   injecting fluid into the molding resin for forming a hollow portion between the first and second mold surfaces; and
   removing the hollow molded product having said thick portion at said bent portion from the mold cavity.

* * * * *